United States Patent
Badoiu et al.

(10) Patent No.: US 8,181,197 B2
(45) Date of Patent: May 15, 2012

(54) SYSTEM AND METHOD FOR VOTING ON POPULAR VIDEO INTERVALS

(75) Inventors: Mihai Badoiu, New York, NY (US); Shanmugavelayutham Muthukrishnan, New York, NY (US)

(73) Assignee: Google Inc., Mountain View, CA (US)

( * ) Notice: Subject to any disclaimer, the term of this patent is extended or adjusted under 35 U.S.C. 154(b) by 864 days.

(21) Appl. No.: 12/027,184

(22) Filed: Feb. 6, 2008

(65) Prior Publication Data

US 2009/0199251 A1 Aug. 6, 2009

(51) Int. Cl.
*H04N 7/173* (2011.01)
(52) U.S. Cl. .......................................................... 725/24
(58) Field of Classification Search ........................ None
See application file for complete search history.

(56) References Cited

U.S. PATENT DOCUMENTS

| | | | |
|---|---|---|---|
| 5,812,642 A | 9/1998 | Leroy | |
| 6,295,092 B1 | 9/2001 | Hullinger et al. | |
| 6,956,593 B1 | 10/2005 | Gupta et al. | |
| 6,993,347 B2 | 1/2006 | Bodin et al. | |
| 7,032,178 B1 | 4/2006 | McKnight et al. | |
| 7,055,168 B1 | 5/2006 | Errico et al. | |
| 7,137,062 B2 | 11/2006 | Kaufman et al. | |
| 7,149,755 B2 | 12/2006 | Obrador | |
| 7,254,605 B1 | 8/2007 | Strum | |
| 7,559,017 B2 | 7/2009 | Mayur et al. | |
| 7,599,950 B2 | 10/2009 | Walther et al. | |
| 7,636,883 B2 | 12/2009 | Albornoz et al. | |
| 7,761,436 B2 | 7/2010 | Norton et al. | |
| 2001/0023436 A1 | 9/2001 | Srinivasan et al. | |
| 2002/0059218 A1 | 5/2002 | August et al. | |
| 2002/0059584 A1 | 5/2002 | Ferman et al. | |
| 2002/0065678 A1* | 5/2002 | Peliotis et al. ................. 705/1 |

(Continued)

FOREIGN PATENT DOCUMENTS

JP 2006155384 A 6/2006

(Continued)

OTHER PUBLICATIONS

"New Feature: Link within a Video," Google Video Blog, Jul. 19, 2006, [online] [Retrieved on Jul. 18, 2008] Retrieved from the internet <URL:http://googlevideo.blogspot.com/2006/07/new-feature-link-within-video_19.html>.

(Continued)

*Primary Examiner* — Joseph P Hirl
*Assistant Examiner* — An Nguyen
(74) *Attorney, Agent, or Firm* — Fenwick & West LLP (57) ABSTRACT

A system and method is provided for identifying popular intervals in online hosted videos. To determine popular intervals associated with a video, a plurality of votes for one or more intervals of the video are collected and organized into a plurality of groups. Each group includes votes for intervals of the video that are similar to each other. A group having the highest number of votes is identified, and a most popular clip of the video is formed based upon the intervals in the group with the highest number of votes. This process can be carried out to determine the groups having the second and third highest number of votes in a single video to form the second and third most popular clips in that video, as well as across numerous videos to identify the most popular clips within different videos.

22 Claims, 5 Drawing Sheets

U.S. PATENT DOCUMENTS

| | | | |
|---|---|---|---|
| 2002/0069218 A1 | 6/2002 | Sull et al. | |
| 2002/0120925 A1* | 8/2002 | Logan | 725/9 |
| 2003/0068046 A1* | 4/2003 | Lindqvist et al. | 380/277 |
| 2003/0093790 A1 | 5/2003 | Logan et al. | |
| 2003/0107592 A1 | 6/2003 | Li et al. | |
| 2003/0112276 A1 | 6/2003 | Lau et al. | |
| 2003/0196164 A1 | 10/2003 | Gupta et al. | |
| 2003/0231198 A1 | 12/2003 | Janevski | |
| 2004/0021685 A1 | 2/2004 | Denoue et al. | |
| 2004/0125133 A1 | 7/2004 | Pea et al. | |
| 2004/0138946 A1 | 7/2004 | Stolze | |
| 2004/0168118 A1 | 8/2004 | Wong et al. | |
| 2004/0205482 A1 | 10/2004 | Basu et al. | |
| 2005/0044254 A1* | 2/2005 | Smith | 709/231 |
| 2005/0081159 A1 | 4/2005 | Gupta et al. | |
| 2005/0203876 A1 | 9/2005 | Cragun et al. | |
| 2005/0203892 A1 | 9/2005 | Wesley et al. | |
| 2006/0041564 A1 | 2/2006 | Jain et al. | |
| 2006/0053365 A1 | 3/2006 | Hollander et al. | |
| 2006/0087987 A1 | 4/2006 | Witt et al. | |
| 2007/0002946 A1* | 1/2007 | Bouton et al. | 375/240.01 |
| 2007/0162568 A1 | 7/2007 | Gupta et al. | |
| 2007/0250901 A1 | 10/2007 | McIntire et al. | |
| 2008/0005064 A1 | 1/2008 | Sarukkai | |
| 2008/0028294 A1* | 1/2008 | Sell et al. | 715/234 |
| 2008/0086742 A1 | 4/2008 | Aldrey | |
| 2008/0091723 A1 | 4/2008 | Zuckerberg et al. | |
| 2008/0250331 A1 | 10/2008 | Tulshibagwale | |
| 2009/0199251 A1 | 8/2009 | Badoiu et al. | |
| 2009/0204882 A1 | 8/2009 | Hollander et al. | |
| 2009/0210779 A1 | 8/2009 | Badoiu et al. | |
| 2009/0249185 A1 | 10/2009 | Datar et al. | |
| 2009/0297118 A1 | 12/2009 | Fink et al. | |
| 2009/0300475 A1 | 12/2009 | Fink et al. | |
| 2010/0169927 A1 | 7/2010 | Yamaoka et al. | |

FOREIGN PATENT DOCUMENTS

| | | | |
|---|---|---|---|
| KR | 2007-0004153 A1 | 1/2007 | |

OTHER PUBLICATIONS

"New commenting and stats features," Google Video Blog, Nov. 14, 2006, [online] [Retrieved on Jul. 18, 2008] Retrieved from the internet <URL:http://googlevideo.blogspot.com/2006/11/new-commenting-and-stats-features.html>.

Good, R., "Online Video Publishing Gets Into the Conversations: Click.TV," Apr. 18, 2006, [online] [Retrieved on Aug. 26, 2008] Retrieved from the internet <URL:http://www.masternewmedia.org/news/2006/04/18/online_video_publishing_gets_into.html>.

"Online Media Bookmark Manager," Media X, Date Unknown, [online] [Retrieved on Jul. 18, 2008] Retrieved from the internet <URL:http://mediax.stanford.edu/documents/bookmark.pdf>.

"Ticket #3504 (new enhancement)," Participatory Culture Foundation, Software Development, Aug. 14, 2006, 1 page, [online] [retrieved on Jan. 16, 2007] Retrieved from the Internet: <URL: https://develop.participatoryculture.org/trac/democracy/ticket/3504>.

Arman, F. et al., "Image Processing on Encoded Video Sequences," Multimedia Systems, 1994, pp. 211-219, vol. 1, No. 5.

Ford, R.M. et al., "Metrics for Shot Boundary Detection in Digital Video Sequences," Multimedia Systems, Jan. 2000, pp. 37-46, vol. 8.

Naphade, M.R. et al., "A High-Performance Shot Boundary Detection Algorithm Using Multiple Cues," 1998 International Conference on Image Processing, Oct. 4-7, 1998, pp. 884-887, vol. 1.

Zabih, R. et al., "A Feature-Based Algorithm for Detecting and Classifying Scene Breaks," Proc. ACM Multimedia 95, San Francisco, CA, Nov. 1993, pp. 189-200.

Arman, F., et al., "Image Processing on Encoded Video Sequences", ACM Multimedia Systems Journal, pp. 211-219, vol. 1, No. 5, 1994.

Ford, R., et al., *Metrics for shot boundary detection in digital video sequences*, Multimedia Systems, Jan. 2000, pp. 37-46, vol. 8.

Gonzalez, N., "Video Ads: Every Startup Has a Different Solution," TechCrunch, Jul. 6, 2007, 7 Pages, [online] [Retrieved on Apr. 20, 2009] Retrieved from the internet <URL:http://www.techcrunch.com/2007/07/06/video-ads-somebody-needs-to-solve-this-problem/>.

Good, R., "Online Video Publishing Gets Into the Conversation: Click.TV," Robin Good, What Communication Experts Need to Know, Apr. 18, 2006, 10 pages, [online] [retrieved on Jan. 16, 2007] Retrieved from the Internet: <URL: http://www.masternewmedia.org/news/2006/04/18/online_video_publishing_gets_into.html>.

Mikolajczyk, K. et al., "A Performance Evaluation of Local Descriptors", IEEE Transactions on Pattern Analysis and Machine Intelligence, Oct. 2005, vol. 27, No. 10, pp. 1615-1630, 16 pages.

Moenne-Loccoz, N., et al., "Managing Video Collections at Large," CUDB '04: Proceedings of the 1st International Workshop on Computer Vision Meets Database, Jun. 2004, pp. 59-66.

Naphade, M.R., et al., "A High Performance Shot Boundary Detection Algorithm using Multiple Cues", 1998 International Conference on Image Processing, pp. 884-887, Oct. 4-7, 1988, Chicago, IL, USA.

Tjondronegoro, D., et al., "Content-Based Video Indexing for Sports Applications Using Integrated Multi-Modal Approach," Multimedia '05: Proceedings of the 13th Annual ACM International Conference on Multimedia, Nov. 2005, p. 1035-1036.

Zabih, R., et al., "A Feature-Based Algorithm for Detecting and Classifying Scene Breaks", Proc. ACM Multimedia 95, pp. 189-200, Nov. 1993, San Francisco, CA.

Zentation.com [online] [Retrieved on Jun. 26, 2009] Retrieved from the internet <URL:http://www.zentation.com/>.

Zentation.com [online] [Retrieved on Jun. 26, 2009] Retrieved from the internet <URL:http://www.zentation.com/viewer/index.phppasscode=epbcSNExIQr>.

Zentation.com [online] [Retrieved on Jun. 26, 2009] Retrieved from the internet <URL:http://www.zentation.com/viewer/setup.php?passcode=De2cwpjHsd>.

"Video Marketing, Video Editing & Hosting, Interactive Video," Veeple.com, 2009, 1 page, [online] [Retrieved on Apr. 20, 2009] Retrieved from internet <URL:http://www.veeple.com/interactivity.php>.

"More on Mojiti," bavatuesdays.com, Mar. 23, 2007, 4 pages, [online] [Retrieved on Apr. 20, 2009] Retrieved from the internet <URL:http://bavatuesdays.com/more-on-mojiti/>.

"BubblePLY," PLYmedia Inc. 2008, 1 page, [online] [Retrieved on Apr. 20, 2009] Retrieved from the internet URL:http://www.plymedia.com/products/bubbleply/bubbleply.aspx>.

"Ooyala—Interactive Video Advertising," Ooyala, Inc. 2009, 1 page, [online] [Retrieved on Apr. 20, 2009] Retrieved from the internet <URL:http://www.ooyala.com/products/ivideo>.

MirriAd, 2008, 1 page, [online] [Retrieved on Apr. 20, 2009] Retrieved from the internet <URL:http://www.mirriad.com>.

Screenshot of "Remixer", YouTube.com, May 2007 to Feb. 2008, 1 page.

Screenshot of Veeple Labs—Interactive Video, [online] [Retrieved on Jun. 9, 2008] Retrieved from the internet <URL:http://www.veeple.com/>.

Screenshot of "Interactive Video Demo—Check out the Yelp / AdSense demo," Ooyala, Inc. 2009, [online] [Retrieved on Apr. 23, 2009] Can be retrieved from the internet <URL:http://www.ooyala.com/products/ivideo>.

Korean Intellectual Property Office Notice of Preliminary Rejection, Korean Patent Application No. 10-2009-7015068, Feb. 5, 2010, 12 pages.

Korean Intellectual Property Office Notice of Preliminary Rejection, Korean Patent Application No. 10-2009-7015068, Oct. 5, 2009, 4 pages.

PCT International Search Report and Written Opinion, PCT/US2009/034422, Oct. 6, 2009, 12 Pages.

PCT International Search Report and Written Opinion, PCT/US2007/088067, Jul. 21, 2008, 13 pages.

PCT International Search Report and Written Opinion, PCT/US2009/042919, Jun. 17, 2009, 8 pages.

PCT International Search Report and Written Opinion, PCT/US2009/033475, Aug. 20, 2009, 7 Pages.

U.S. Appl. No. 12/266,476, filed Nov. 6, 2008, 45 Pages.

U.S. Appl. No. 61/097,167, filed Sep. 15, 2008, 49 Pages.

U.S. Appl. No. 60/756,787, filed Jan. 6, 2006, 19 pages.

U.S. Appl. No. 12/414,553, filed Mar. 30, 2009, 41 Pages.
U.S. Appl. No. 12/411,162, filed Mar. 25, 2009, 38 Pages.
Examiner's first report on Australian Patent Application No. AU 2010249316, Mailed Jun. 20, 2011, 3 Pages.

First Office Action issued on Feb. 28, 2012 for Chinese Patent Application No. CN 200980108230.7, 11 Pages.

* cited by examiner

SYSTEM AND METHOD FOR VOTING ON POPULAR VIDEO INTERVALS

TECHNICAL FIELD

The disclosed embodiments relate generally to the management and display of votes for popular intervals within video programs.

BACKGROUND

The proliferation of video sharing through websites provides numerous opportunities to collaborate and experience videos in online communities. Video hosting websites allow users to upload, view, and rate videos. Users browsing a video hosting website can locate videos of interest by, for example, searching for videos, browsing directories, or sorting by ratings.

User rating of videos provides a way to complement video with useful information. However, because user ratings are for an entire video, it is difficult to know which portions of the video the users found particularly interesting. In addition, there is no way to navigate videos to find the most popular portions of the video. Although a user may wish to view only the most popular portions of the video, the user has to view the entire video because the most popular parts of the video have not been determined.

SUMMARY

The present invention includes systems and methods for identifying popular intervals in online hosted videos. Users vote on intervals within various videos stored in an online video hosting website. To determine popular intervals associated with a video, the votes for one or more intervals of the video are collected and organized into groups. Each group includes votes for intervals of the video that are similar to each other. A group having the highest number of votes is identified, and a most popular clip of the video is formed based upon the intervals in the group. This process can be expanded to determine any number of groups in a given video having a first, second, third, or other number of highest number of votes as desired, forming the respective popular intervals within a single video, and across multiple videos, to identify the popular intervals within a large number of different videos.

Groups can be formed in a variety of ways. For example, votes can be clustered into groups based on a timestamp associated with each vote. Also, votes can be clustered based on the start times and the end times of the intervals. Groups can be associated with identified scenes or features in the video. In addition, groups can be formed based on a determination of the maximum number of indications of popular clips that can be visually distinguished on a timeline corresponding to the video. The amount of time between intervals can also be taken into account in forming the groups.

A system determines popular intervals associated with a video. The system includes various modules. An extraction module extracts a plurality of votes associated with one or more intervals of the video. The grouping module forms a plurality of groups, each including votes for similar intervals of the video. The vote determination module determines a group having the highest number of votes, and the clip generation module forms a most popular clip of the video based upon the intervals in the group.

The features and advantages described in this summary and the following detailed description are not all-inclusive. Many additional features and advantages will be apparent to one of ordinary skill in the art in view of the drawings, specification, and claims presented herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

Figure 1:
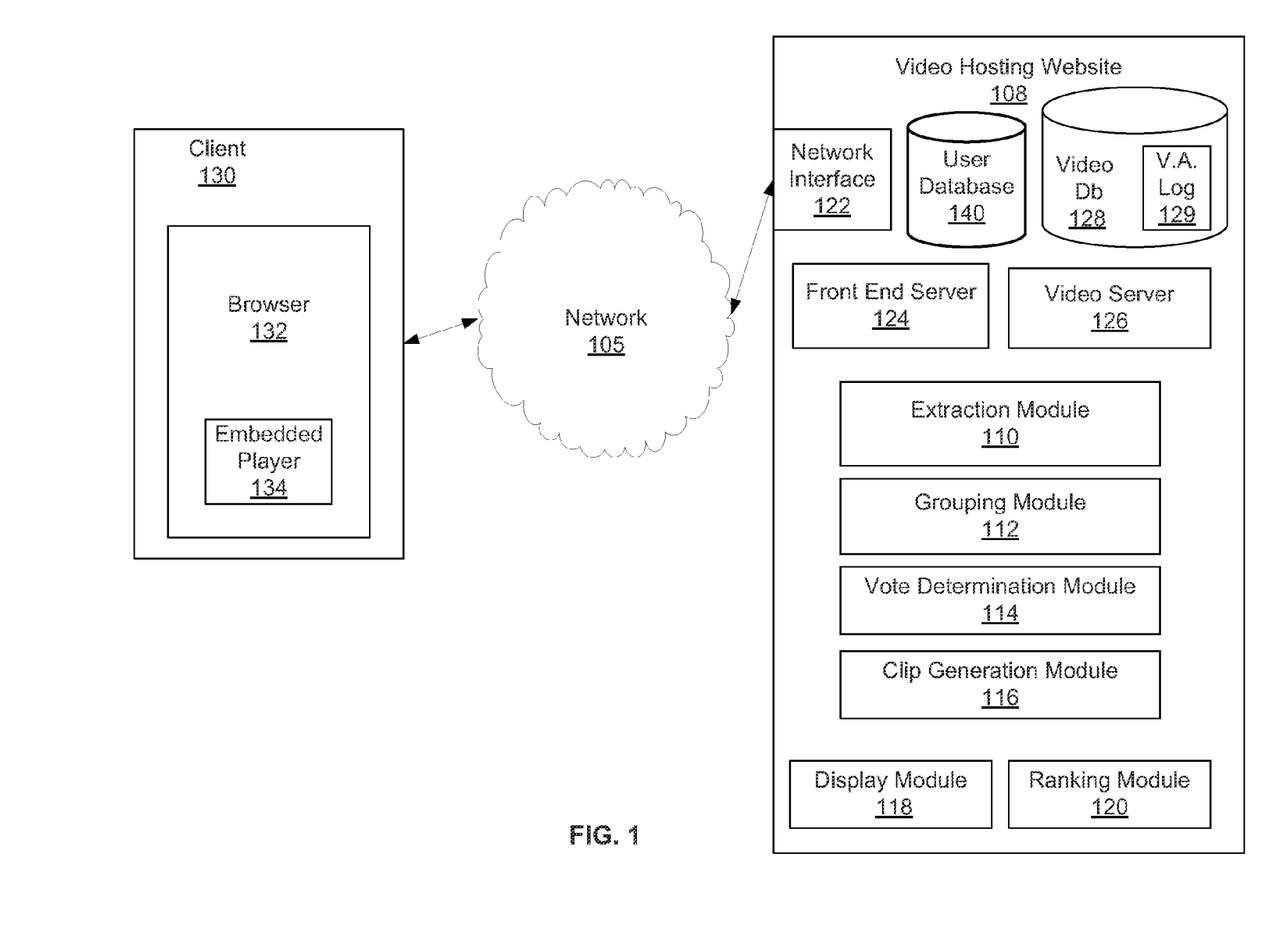
FIG. 1 is a block diagram of a system architecture for identifying popular intervals in online hosted videos in accordance with one embodiment of the present invention.

FIG. 1 is a block diagram of a system architecture in accordance with one embodiment. As illustrated in FIG. 1, a video hosting website 108 includes a front end server 124, a video server 126, a network interface 122, an extraction module 110, a grouping module 112, a video determination module 114, a clip generation module 116, a display module 118, a ranking module 120, a video database 128, and a user database 140. Other conventional features, such as firewalls, load balancers, application servers, failover servers, site management tools, and so forth are not shown so as to more clearly illustrate the features of the system. Examples of a suitable website 108 for implementation of the system include the YouTube™ and Google Video™ websites; other video hosting sites are known as well, and can be adapted to operate according the teaching disclosed herein. It will be understood that the term "website" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 105 via the network interface 122. In general, functions described in one embodiment as being performed on the server side can also be performed on the client side in other embodiments if appropriate.

A client 130 executes a browser 132, and connects to the front end server 124 via a network 105, which is typically the Internet, but may also be any network, including but not limited to a LAN, a MAN, a WAN, a mobile, wired or wireless network, a private network, or a virtual private network. While only a single client 130 and browser 132 are shown, it is understood that very large numbers (e.g., millions) of clients are supported and can be in communication with the website 108 at any time. The client 130 may include a variety of different computing devices. Examples of client devices 130 are personal computers, digital assistants, personal digital assistants, cellular phones, mobile phones, smart phones or laptop computers. As will be obvious to one of ordinary skill in the art, the present invention is not limited to the devices listed above.

In some embodiments, the browser 132 includes an embedded video player 134 such as, for example, the Flash™ player from Adobe Systems, Inc. or any other player adapted for the video file formats used in the video hosting website 108. A user can access a video from the video hosting website 108 by browsing a catalog of videos, conducting searches on keywords, reviewing play lists from other users or the system administrator (e.g., collections of videos forming channels), or viewing videos associated with particular user group (e.g., communities).

Video server 126 receives uploaded media content from content providers and allows content to be viewed by client 130. Content may be uploaded to video server 126 via the Internet from a personal computer, through a cellular network from a telephone or PDA, or by other means for transferring data over network 105 known to those of ordinary skill in the art. Content may be downloaded from video server 126 in a similar manner; in one embodiment media content is provided as a file download to a client 130; in an alternative embodiment, media content is streamed client 130. The means by which media content is received by video server 126 need not match the means by which it is delivered to client 130. For example, a content provider may upload a video via a browser on a personal computer, whereas client 130 may view that video as a stream sent to a PDA. Note also that video server 126 may itself serve as the content provider.

Users of clients 130 can also search for videos based on keywords, tags or other metadata. These requests are received as queries by the front end server 124 and provided to the video server 126, which is responsible for searching the video database 128 for videos that satisfy the user queries. The video server 126 supports searching on any fielded data for a video, including its title, description, tags, author, category and so forth.

Users of the clients 130 and browser 132 can upload content to the video hosting website 108 via network 105. The uploaded content can include, for example, video, audio or a combination of video and audio. The uploaded content is processed and stored in the video database 128. This processing can include format conversion (transcoding), compression, metadata tagging, and other data processing. An uploaded content file is associated with the uploading user, and so the user's account record is updated in the user database 140 as needed.

For purposes of convenience and the description of one embodiment, the uploaded content will be referred to a "videos", "video files", or "video items", but no limitation on the types of content that can be uploaded are intended by this terminology. Each uploaded video is assigned a video identifier when it is processed.

The video database 128 is used to store the received videos. The video database 128 stores video content and associated metadata, provided by their respective content owners. The video files have metadata associated with each file such as a video ID, artist, video title, label, genre, and time length.

Information about the votes received is stored in the user database 140. The user database 140 is responsible for maintaining a record of all users viewing videos on the website. Each individual user is assigned a user ID. The user ID can be based on any identifying information, such as the user's IP address, user name, or the like. The user database may also contain information about the reputation of the user in both the video context, as well as through other applications, such as the use of email or text messaging.

A video access log 129 within video database 128 stores each instance of video access. Votes can be submitted by clicking on an indicator or on a portion of a time line associated with the video. Users may also click and drag on the time line to specify a vote for a longer interval of video. Users may also submit votes via a digital video recorder (DVR) or with a device providing similar functionality, such as by using a remote control configured to allow entry of votes through a user interface associated with the device. Each entry in the access log 129 identifies a video being accessed, a time of access, an IP address of the user, a user ID if available, cookies, search queries, data identifying the type of interaction with the video, and the time of every interaction with the video. Interaction types can include any user interactions in the user interface of the website 108, such as playing, pausing, rewinding, forwarding and submitting votes or ratings for a video.

Figure 3:
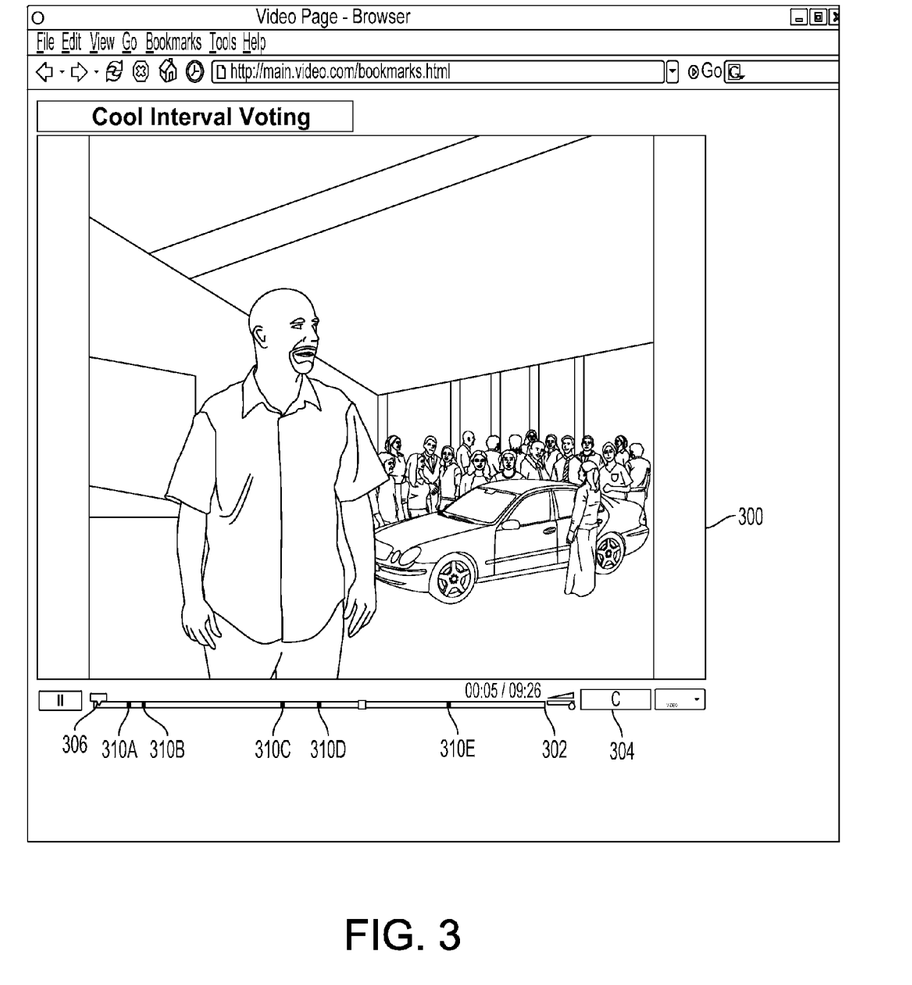
FIG. 3 illustrates a user interface for entering votes for intervals of video in accordance with one embodiment of the present invention.

Turning now to FIG. 3, an example of a web page providing a user interface for entering votes and viewing media content from video server 126 by client 130 is depicted. The web page includes a video 300, and may include information about the video, such as the name or user ID of the content provider, the date the video was uploaded, etc. (not shown). The web page also contains a timeline 302, which corresponds to the video 300. The marker 306 on timeline 302 indicates the concurrent position of the video 300 being displayed.

Users can indicate a vote for an interval of video in various ways. For example, users can click the "C" button 304 when they view an interval of video on which they wish to vote. Users can also click and hold the "C" button 304 to indicate an interval longer than one click. As another option, users can click the "C" button 304 to mark the start time of an interval and click the "C" button 304 again to indicate the end of an interval on which they are voting. The depiction in FIG. 3 is one example of a user interface for receiving votes for video intervals. One of ordinary skill in the art would recognize that other user interfaces could be used in accordance with the present invention.

Figure 2:
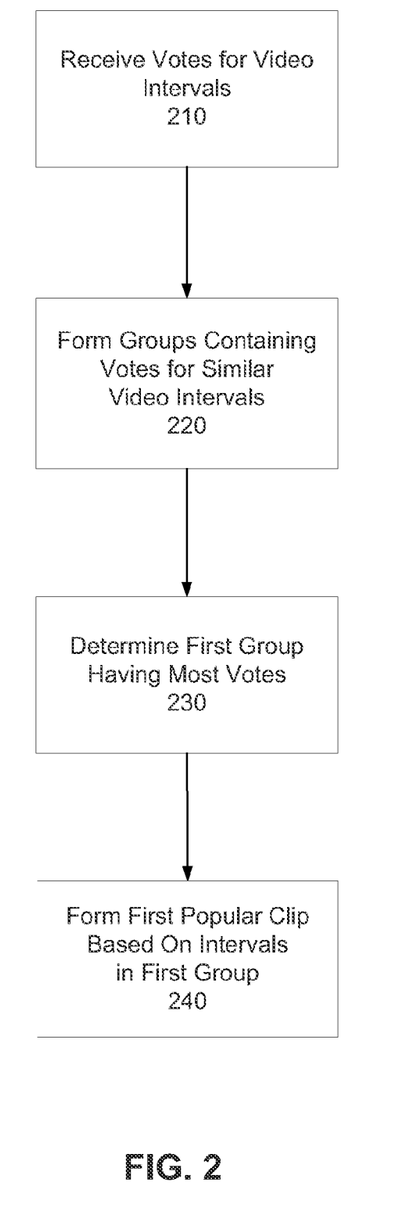
FIG. 2 illustrates a method for identifying popular intervals in online hosted videos in accordance with an embodiment of the present invention.

The modules 110-120 of FIG. 1 can be used to carry out the method depicted in FIG. 2. Extraction module 110 extracts received 210 voting events from the video access log 129. An interval may be a specific moment in a video (such as 2 minutes, 3 seconds), or it may be a range of time (from 2 minutes, 3 seconds until 2 minutes, 45 seconds). The user information associated with the votes can include, for example, a time the vote was received, a timestamp associated with each vote, a start time and an end time of the intervals associated with the votes, and a reputation score for the user submitting the vote. The user information can be stored in user database 140. Extraction module 110 extracts votes and sorts them by video ID and time stamp to form voting blocks. Each block of votes is associated with a video, and sorted by time stamp.

The grouping module 112 forms 220 groups containing votes for similar intervals of the video. The groups of votes within a block of votes may be formed by a variety of methods. For example, the grouping module 112 forms a plurality of groups by clustering votes based on a timestamp associated with each vote. If the votes have timestamps within a specified time limit of each other, the grouping module determines that they relate to similar intervals of video and are clustered. For example, votes that have a timestamp within 5 seconds of each other are determined to refer to similar intervals. For example, some users may timestamp an action at its beginning, some at its climax and some immediately after it finishes. Using this technique, these votes would be grouped together.

In another embodiment, the votes are clustered based on the start times and the end times of the intervals. For example, if there is sufficient overlap (e.g. 25%) between intervals (bounded by the start times and the end times of the intervals with which the votes are associated), the grouping module 112 determines that the votes relate to similar intervals of the video. This allows for votes to be grouped even where the intervals to which they are associated are not identical.

Various methods for clustering the votes may be used. Some examples of well-known clustering methods include k-means or k-center clustering.

In another embodiment, the grouping module 112 forms groups by determining an amount of time between the intervals with which the votes are associated. If a sufficient amount of time exists between intervals (for example, 30 seconds), grouping module 112 forms a new group for the votes associated with the intervals. For instance, if only 5 seconds exists between two intervals in question in a 10 minute video, grouping module could decline to form new group for the intervals.

Another way grouping module 112 forms groups is by identifying a plurality of scenes or features in a video and associating each group with one or more scenes or features. A feature is a succinct representation of the content of one or more frames of video that are similar. For example, the grouping module 112 may group the frames into logical units, such as scenes or shots. The grouping module 112 may use scene detection algorithms to group the frames automatically. One scene detection algorithm is described in Naphade, M. R., et al., "A High-Performance Shot Boundary Detection Algorithm Using Multiple Cues", 1998 International Conference on Image Processing (Oct. 4-7 1998), vol. 1, pp. 884-887, which is incorporated by reference herein, though there are many scene detection algorithms known in the art that can be used equally as well. The grouping module would then determine which scenes had the highest number of votes in determining the popular intervals.

Thus, the grouping module 112 can compute one feature set for all frames that belong to the same scene. The feature can be, for example, a description of a characteristic in the time, spatial, or frequency domains. For example, votes can be associated with a specific frame, and can describe that frame by its time, position, and frequency domain characteristics. The grouping module 112 can use any technique for determining features of video, such as those described in Zabih, R., Miller, J., and Mai, K., "Feature-Based Algorithms for Detecting and Classifying Scene Breaks", Proc. ACM Multimedia 95, San Francisco, Calif. (Nov. 1993), pp. 189-200; Arman, F., Hsu, A., and Chiu, M-Y., "Image Processing on Encoded Video Sequences", Multimedia Systems (1994), vol. 1, no. 5, pp. 211-219; Ford, R. M., et al., "Metrics for Shot Boundary Detection in Digital Video Sequences", Multimedia Systems 2000), vol. 8, pp. 37-46, all of the foregoing being incorporated by reference herein. One of ordinary skill in the art would recognize various techniques for determining features of video.

In another embodiment, the grouping module 112 forms groups by determining a maximum number of indications of popular clips that can be visually distinguished on a timeline corresponding to the video. For example, a long video may have a large number of votes associated with a variety of intervals. Indications of popular clips might be difficult to visually distinguish on the timeline due to limitation on the image size and resolution. As such, more groups may be needed for a longer video than for a shorter video. In light of the difficulty of visually distinguishing large numbers of indications of popular clips on a timeline, grouping module 112 can set a maximum amount of groups that it will form based on this visual indication. Thus, even though there may be more than, for example, 10 popular clips, grouping module 112 may limit the indications displayed to the 10 most popular clips in a given video. In addition, grouping module 112 can also limit an action-packed short video to a maximum number of popular clips to ease visual distinction of the indications on a time line as well.

For a given video, the vote determination module 114 determines 230 a group having the highest number of votes in a variety of ways. For example, vote determination module 114 assigns a weight to each vote based on whether the vote was provided by a unique user and determines the group based on the assigned weights of the votes. Thus, the group may be determined to have the highest number of votes based on the weight assigned to each vote, rather than the absolute number of votes received. In another embodiment, vote determination module 114 assigns a weight to each vote based on the reputation score associated with the vote. A vote may be associated with a reputation score, for example, based on whether the vote was submitted by a new or unrecognized user, the usefulness of the votes previously submitted by the user, or other information about the user within user database 140.

Vote determination module 114 determines a group having the second highest number of votes similarly to the determination of the highest number of votes described above. This allows for the first and second most popular clips to be formed for a given video. This method can be expanded to allow vote determination module 114 to determine any number of groups in a given video having a first, second, third or other number of highest number of votes as desired.

The clip generation module 116 is adapted to form 240 a clip of a video based on the intervals in a given group. There are various ways to form clips. In one embodiment, the clip generation module 116 examines only the start time of the intervals that have received votes. Thus, all of the considered intervals will start at some time instant within the video and continue to the end of the video. Alternatively, clip generation module 116 may consider both start and end times for intervals that have received votes. Clip generation module 116 can then use these times to determine the earliest (or latest) point of any interval in the group and round it to the start of the scene just before (or after) it.

In another embodiment, clip generation module 116 projects the contribution of each of the intervals in the group on a time line, such as by adding the weight of the votes for each interval, or the logarithm of the number of votes for each time instant. The clip generation module 116 then fits a probabilistic model to the distribution (e.g., Gaussian distribution) of votes on the time line by standard statistical methods, and then selects the mean as the center. The clip generation module 116 can then select a certain number (e.g., three) of standard deviations to either side of the mean to identify an initial start and end time for the clip, and then adjusts these start and end times to the nearest scene boundaries.

In another embodiment, the clip generation module 116 examines traffic traces to determine how much each instant of the video was watched by different users, which may include those who have not voted. This information can also be used in conjunction with the above methods to determine where a clip should begin and end. In one embodiment, the instances of video that have received the most traffic within a given time period are considered to be part of the same clip and are used in determining the length of the clip.

For example, assume a 3:00 minute video depicts an actor on a motorcycle performing a stunt, such as jumping over a shark in the water, with the apex of the jump taking place at 2:00. One vote might be for an interval from two seconds prior to and two seconds after the jump (e.g. 1:58-2:02); another vote might be for the apex of the jump (e.g. 2:00); a third vote might be for the interval lasting from before the jump until after the motorcycle has safely landed (e.g. 1:50-2:10). Based on these intervals, clip generation module 116 forms the popular clip (e.g. 1:54-2:06). In this example, clip generation module forms the popular clip by averaging the time within the intervals associated with the three votes.

The ranking module 120 ranks popular clips based on the votes in each group. The ranking module 120 also ranks popular clips across multiple videos. As can be appreciated, the various modules can determine the popular clip(s) in any number of videos to identify the most popular clips overall. The ranking module 120 can be used in conjunction with video searching as well, such that videos that are determined to be responsive to a search query can be ranked based on the votes for groups for each responsive video. In one embodiment, the ranking module 120 determines the rank of the videos as a function of the number of votes for the most popular interval in each video. In another embodiment, the ranking module 120 determines the rank of the videos as a function of the total number of votes received for all groups within each video.

The display module 118 provides for the display of an indication of popular clips on a timeline associated with the videos. This allows a user to efficiently understand and access the most popular clips in one or more videos. The display module 118 can also create a highlights segment or trailer of a given video by forming an excerpt of a video that includes a first popular clip and a second popular clip and displaying the excerpt.

The videos database 128 stores lists of the videos with the most popular clips. The lists may be grouped by genre, rating, or any other property. The lists of related videos are updated hourly, in one example, by performing an analysis of voting activity from user database 140. Once the lists of the most popular clips have been generated, the video server 126 extracts the videos from the video database 128 based on the lists and provides the videos to users for viewing.

Figure 4:
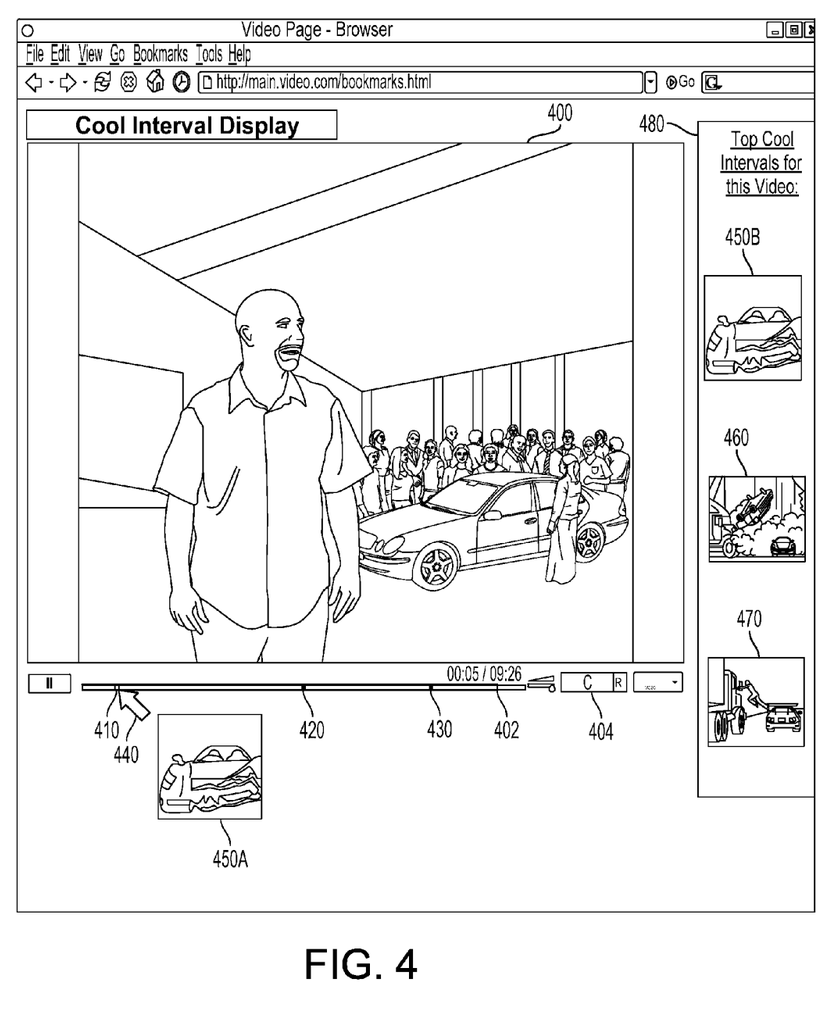
FIG. 4 illustrates a user interface for entering votes for intervals of video and viewing popular clips of video in accordance with one embodiment of the present invention.

In FIG. 3, clients submitted numerous votes 310A-310E, which are depicted on timeline 302. As illustrated in FIG. 4, votes 310A-310E (with other votes, not shown) have been used to form popular clips of video. For example, votes 310A and 310B have been used (with other votes, not shown) to form popular clip 410; votes 310C-310D have been used to form popular clip 420; vote 310E has been used to form popular clip 430.

In FIG. 4, each of the popular clips shown on timeline 402, which corresponds to video 400, is associated with a thumbnail. For example, when cursor 440 is placed over the indication for popular clip 410, thumbnail 450A appears. In one embodiment, the ranked popular clips can also be shown in another section 480 of the user interface. For example, thumbnail 450B corresponds to the most popular clip for video 400; thumbnail 460 corresponds to the second most popular clip; thumbnail 470 corresponds to the third most popular clip. The indications on timeline 402 can be numbered to indicate their rank order. The user interface depicted in FIG. 4 also allows the user to submit a vote for an interval by clicking on "C" button 404 while viewing the indications of the most popular clips.

Figure 5:
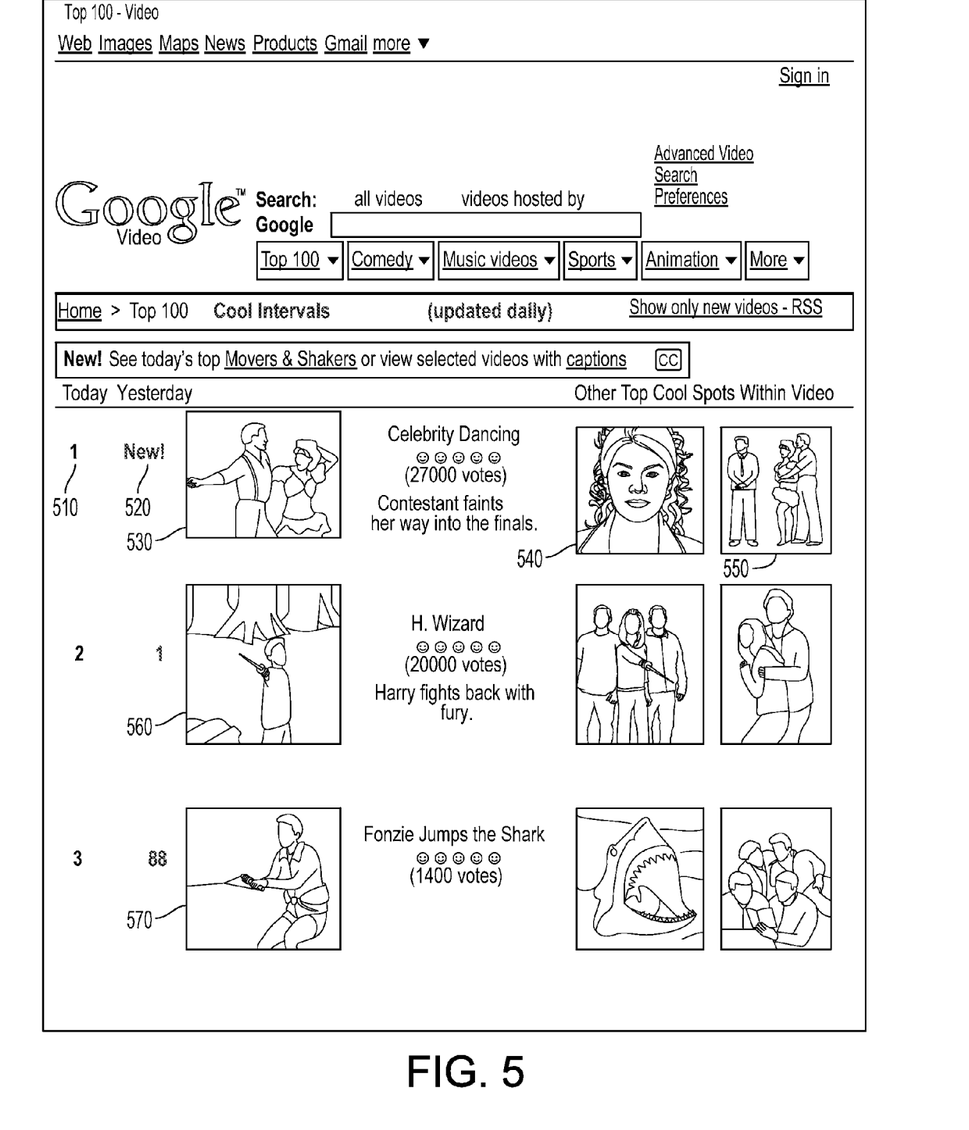
FIG. 5 illustrates a user interface for viewing popular clips of video in accordance with one embodiment of the present invention.

Turning now to FIG. 5, another example of the display of popular clips is illustrated. This user interface indicates the top popular clips over the course of two days. For example, the most popular clip "1" 510 for the current day is depicted as thumbnail 530. Because the interval was not available the day before, the video interval is listed as "New!" 520. Thumbnails 540 and 550 depict the second and third most popular clips from the video containing the most popular clip. The second most popular clip thumbnail 560 from a second video and third most popular clip thumbnail 570 from a third video for the current day are also depicted below the most popular clip thumbnail 530.

In another embodiment, users can access the most popular clips for videos using a DVR or a device providing similar functionality. By using a remote control or a viewing default, users of a device can access the most popular clips within a single video and across multiple videos. This would allow users to view the highlights of a given video or set of videos (such as the sports highlights for a given time period).

The ranked list of popular clips for all videos is stored in the video database 128. The ranked list of video clips is updated on an hourly basis, according to one embodiment. This ensures the most up to date relevant videos is presented to users. The ranked list may also be updated on a daily basis. The time in which the ranked list is updated is merely illustrative of the times in which an appropriate update can take place and the update can occur at any suitable time set by the administrator of the video hosting website 108.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for determining popular intervals associated with a first video, the method comprising:
   receiving a plurality of votes from users while the users are viewing the first video, each vote identifying an interval of the first video, the plurality of votes comprising a first vote associated with a first interval and a second vote associated with a second interval different from the first internal;
   forming a plurality of interval groups by identifying a plurality of scenes or features in the first video and associating each interval group with a set of one or more scenes or with a set of one or more features in the first video, each interval group including intervals of the first video that are similar to each other;
   determining a first one of the interval groups having a highest number of associated votes; and
   responsive to determining the first interval group having the highest number of associated votes, forming a first popular clip of the first video from video content of the intervals in the first interval group, the first popular clip being a continuous portion of the first video having a single start time and a single end time.

2. The method of claim 1, wherein forming the plurality of interval groups comprises clustering the votes based on a timestamp associated with each vote.

3. The method of claim 1, wherein each interval has a start time and an end time, and forming the plurality of interval groups comprises clustering the votes based on the start times and the end times of the intervals.

4. The method of claim 1, wherein each vote has a reputation score associated with a user providing the vote.

5. The method of claim 4; further comprising:
   assigning a weight to each vote based on the reputation score; and
   determining the first interval group having the highest number of votes based on the assigned weights of the votes.

6. The method of claim 1, further comprising:
   assigning a weight to each vote based on whether the vote was provided by a unique user; and
   determining the first interval group having the highest number of votes based on the assigned weights of the votes.

7. The method of claim 1, wherein forming the plurality of interval groups comprises determining a maximum number of popular clips permitted based on a number of indications of popular clips that can be visually distinguished on a timeline corresponding to the first video.

8. The method of claim 1, wherein forming the plurality of interval groups comprises determining an amount of time between the intervals with which the votes are associated.

9. The method of claim 1, further comprising:
   displaying an indication of the first popular clip on a timeline associated with the first video.

10. The method of claim 1, further comprising:
    determining a second interval group having a second highest number of votes;
    forming a second popular clip based on the intervals in the second interval group; and
    ranking the first popular clip and the second popular clip based on the votes in each interval group.

11. The method of claim 10, further comprising:
    displaying an indication of the first popular clip and an indication of the second popular clip of the first video.

12. The method of claim 10, further comprising:
    forming an excerpt of the first video comprising the first popular clip and the second popular clip; and
    displaying the excerpt.

13. The method of claim 1, further comprising:
    receiving a plurality of votes associated with one or more intervals of a second video;
    forming a plurality of interval groups for the second video, each interval group including votes for intervals of the second video that are similar to each other;
    determining a first interval group for the second video having a highest number of votes received for a similar interval in the second video;
    forming a first popular clip of the second video based upon the intervals in the first interval group for the second video; and
    ranking the first video and the second video based on a number of votes associated with each popular clip of the first video and of the second video.

14. A system for determining popular intervals associated with a video comprising:
    an extraction module, adapted to extract a plurality of votes from users while the users are viewing the video, each vote identifying an interval of the video, the plurality of votes comprising a first vote associated with a first interval and a second vote associated with a second interval different from the first interval:
    a grouping module, adapted to form a plurality of interval groups by identifying a plurality of scenes or features in the video and associating each interval group with a set of one or more scenes or with a set of one or more features in the video, each interval group including intervals of the video that are similar to each other; a vote determination module, adapted to determine a first one of the interval groups having a highest number of associated votes; and
    a clip generation module, adapted to form a popular clip of the video from video content of the intervals in the first interval group, responsive to the vote determination module determining the first interval group having the highest number of associated votes, the first popular clip being a continuous portion of the first video having a single start time and a single end time.

15. The system of claim 14, further comprising:
    a display module, adapted to display an indication of the popular clip on a graphical timeline associated with the video, the timeline displayed within a user interface for viewing the video.

16. The system of claim 14, further comprising:
    a ranking module, adapted to rank popular clips within one or more videos.

17. A computer program product having a non-transitory computer readable storage medium and including computer executable code for determining popular intervals associated with a first video, the code adapted to perform steps comprising:

receiving a plurality of votes from users while the users are viewing the first video, each vote identifying an interval of the first video, the plurality of votes comprising a first vote associated with a first interval and a second vote associated with a second interval different from the first interval;

forming a plurality of interval groups by identifying a plurality of scenes or features in the first video and associating each interval group with a set of one or more scenes or with a set of one or more features in the first video, each interval group including intervals of the first video that are similar to each other;

determining a first one of the interval groups having a highest number of associated votes; and responsive to determining the first interval group having the highest number of associated votes, forming a first popular clip of the first video from video content of the intervals in the first interval group, the first popular clip being a continuous portion of the first video having a single start time and a single end time.

18. The computer program product of claim 17, further comprising:

determining a second one of the interval groups having a second highest number of associated votes;

forming a second popular clip based on the intervals in the second interval group; and ranking the first popular clip and the second popular clip based on the votes in the first group and the votes in the second group.

19. The computer program product of claim 17, wherein forming the plurality of interval groups comprises clustering the votes based on a timestamp associated with each vote.

20. The computer program product of claim 17, wherein each interval has a start time and an end time, and forming the plurality of interval groups comprises clustering the votes based an the start times and the end times of the intervals.

21. The computer program product of claim 17, further comprising:

receiving a plurality of votes from a user while the user is viewing a second video, each vote associated with an interval of the second video;

forming a plurality of interval groups for the second video, each interval group including intervals of the second video that are similar to each other;

determining a first one of the interval groups for the second video having a highest number of associated votes of the interval groups for the second video;

responsive to determining the first interval group for the second video having the highest number of associated votes, forming a first popular clip of the second video from video content of the intervals in the first group for the second video, the first popular clip of the second video being a continuous portion of the second video having a single start time and a single end time; and ranking the first video and the second video based on a number of votes associated with each popular clip of the first video and of the second video.

22. The computer program product of claim 17, wherein the first interval group corresponds to less than the entirety of the first video.

* * * * *

UNITED STATES PATENT AND TRADEMARK OFFICE
CERTIFICATE OF CORRECTION

PATENT NO. : 8,181,197 B2
APPLICATION NO. : 12/027184
DATED : May 15, 2012
INVENTOR(S) : Mihai Badoiu et al.

Page 1 of 1

It is certified that error appears in the above-identified patent and that said Letters Patent is hereby corrected as shown below:

Column 12, line 7, Claim 20; after "based", replace "an" with "on"

Signed and Sealed this
Fourteenth Day of August, 2012

David J. Kappos
*Director of the United States Patent and Trademark Office*